(12) United States Patent
Fertitta

(10) Patent No.: US 11,477,418 B2
(45) Date of Patent: Oct. 18, 2022

(54) SYSTEMS AND METHODS FOR PROVIDING A SHOULDER SPEAKER MICROPHONE DEVICE WITH AN INTEGRATED THERMAL IMAGING DEVICE

(71) Applicant: Harris Global Communications, Inc., Rochester, NY (US)

(72) Inventor: Joseph Fertitta, Rochester, NY (US)

(73) Assignee: Harris Global Communications, Inc., Rochester, NY (US)

( * ) Notice: Subject to any disclaimer, the term of this patent is extended or adjusted under 35 U.S.C. 154(b) by 158 days.

(21) Appl. No.: 16/870,512

(22) Filed: May 8, 2020

(65) Prior Publication Data
US 2021/0352247 A1 Nov. 11, 2021

(51) Int. Cl.
| | |
|---|---|
| *G06V 10/25* | (2022.01) |
| *H04N 7/18* | (2006.01) |
| *G08B 21/04* | (2006.01) |
| *H04N 5/232* | (2006.01) |
| *H04R 1/02* | (2006.01) |

(Continued)

(52) U.S. Cl.
CPC .............. *H04N 7/188* (2013.01); *G08B 21/04* (2013.01); *H04N 5/23293* (2013.01); *H04N 7/185* (2013.01); *H04R 1/028* (2013.01); *H04R 1/08* (2013.01); *G06V 10/19* (2022.01); *G06V 10/20* (2022.01); *G06V 10/22* (2022.01); *G06V 10/225* (2022.01); *G06V 10/23* (2022.01); *G06V 10/25* (2022.01); *H04R 2499/11* (2013.01)

(58) Field of Classification Search
CPC .... H04N 7/188; H04N 5/23293; H04N 7/185; H04N 5/33; H04N 5/2252; H04N 5/23206; H04N 5/23216; G08B 21/04; H04R 1/028; H04R 1/08; H04R 2499/11; H04B 1/385
See application file for complete search history.

(56) References Cited

U.S. PATENT DOCUMENTS

| | | |
|---|---|---|
| 4,899,388 A | 2/1990 | Mlodzikowski et al. |
| 7,339,608 B2 | 3/2008 | Ryley et al. |
| | (Continued) | |

FOREIGN PATENT DOCUMENTS

| | | |
|---|---|---|
| CN | 202652444 U | 1/2013 |
| CN | 207150708 U | 3/2018 |
| CN | 108924395 A | 11/2018 |

OTHER PUBLICATIONS

Suriani, Sensors 2013, 13, 9966-9998; doi:10.3390/s130809966 "Sudden Event Recognition: A Survey" (Year: 2013).*

(Continued)

*Primary Examiner* — Frank F Huang
(74) *Attorney, Agent, or Firm* — Fox Rothschild LLP; Robert J. Sacco; Carol E. Thorstad-Forsyth

(57) ABSTRACT

Systems (100) and methods (1000) for operating a shoulder Speaker Microphone ("SM") device coupled to a radio. The methods comprising: using a speaker and a microphone of the shoulder SM device to facilitate auditory communications to and from a user of the radio; activating a thermal imaging device integrated with the shoulder SM device when the shoulder SM device resides at a location of an incident event; capturing thermal images by the thermal imaging device of the shoulder SM device; and performing operations by the shoulder SM device to cause the thermal images to be streamed over a network.

20 Claims, 7 Drawing Sheets

(51) Int. Cl.
*H04R 1/08* (2006.01)
*G06V 10/10* (2022.01)
*G06V 10/20* (2022.01)
*G06V 10/22* (2022.01)

(56) References Cited

U.S. PATENT DOCUMENTS

| | | | |
|---|---|---|---|
| 7,999,226 | B1 | 8/2011 | Koller et al. |
| 9,884,630 | B1* | 2/2018 | Ross ................... B60W 10/18 |
| 2016/0216130 | A1* | 7/2016 | Abramson ......... G01C 21/3423 |
| 2017/0225336 | A1* | 8/2017 | Deyle ................. G08B 13/196 |
| 2018/0356237 | A1* | 12/2018 | Abramson .............. H04W 4/38 |
| 2019/0266414 | A1* | 8/2019 | Stawiszynski ......... G06Q 50/26 |
| 2019/0376798 | A1* | 12/2019 | Abramson ......... G01C 21/3641 |
| 2020/0057896 | A1* | 2/2020 | Pohl ................... G06K 9/00805 |
| 2021/0208949 | A1* | 7/2021 | Bijwe .................. G06F 9/5044 |
| 2021/0286980 | A1* | 9/2021 | Stawiszynski ..... G06K 9/00771 |

OTHER PUBLICATIONS

Extended European Search Report issued in EP21172452.1 dated Sep. 28, 2021.

* cited by examiner

SYSTEMS AND METHODS FOR PROVIDING A SHOULDER SPEAKER MICROPHONE DEVICE WITH AN INTEGRATED THERMAL IMAGING DEVICE

FIELD

This document relates generally to communication systems. More particularly, this document relates to systems and methods for providing a shoulder radio Speaker Microphone ("SM") device with an integrated thermal imaging device.

BACKGROUND

A thermal imaging camera is a vital tool for firefighters. Typically, a crew of firefighters will carry a single thermal imaging camera. Currently, the benefits of the conventional thermal imaging camera are limited to the explicit user, and can only be viewed in real-time or near real-time (i.e., immediately or in milliseconds from the time of capture) on the display of the camera.

SUMMARY

The present disclosure concerns implementing systems and methods for operating a shoulder SM device coupled to a radio. The methods comprise: using a speaker and a microphone of the shoulder SM device to facilitate auditory communications to and from a user of the radio; activating a thermal imaging device integrated with the shoulder SM device when the shoulder SM device resides at a location of an incident event; capturing thermal images by the thermal imaging device of the shoulder SM device; and performing operations by the shoulder SM device to cause the thermal images to be streamed over a network.

Activation of the thermal imaging device may be achieved through a user-software interaction facilitated by a user interface element of the shoulder SM device, automatically in response to a signal received from a remote device, automatically in response to a voice command received by the shoulder SM device or the radio, or autonomously based on location information generated by a location device of the shoulder SM device or radio.

In some scenarios, the method also comprise: displaying the thermal images on a display integrated with the shoulder SM device in real-time or near real-time; detecting an injured or unresponsive person based on at least one of the thermal images and location information generated by a location device of the shoulder SM device or radio; issuing an alarm, alert or notification indicating that an injured or unresponsive person has been detected; and/or tracking movement of the injured or unresponsive person based on at least the thermal images. The alarm, alert or notification causes one or more individuals to be dispatched to the last known location of the injured or unresponsive person.

In those or other scenarios, the methods further comprise: storing the thermal images in at least one of a memory local to the shoulder SM device and a remote datastore; and/or deactivating the thermal imaging device when the incident event is resolved, the user of the radio has checked-out of the incident event, or the shoulder SM device no longer resides at a location of the incident event. Deactivation of the thermal imaging device may be achieved through a user-software interaction facilitated by a user interface element of the shoulder SM device, automatically in response to a signal received from a remote device, automatically in response to a voice command received by the shoulder SM device or radio, or autonomously based on location information generated by a location device of the shoulder SM device or radio.

The present document also concerns a shoulder SM device. The shoulder SM device comprises: a housing; an audio transducer disposed in the housing and configured to output audio; a microphone disposed in the housing and configured to capture audio; a thermal imaging device disposed in the housing, configured to be activated when the shoulder SM device resides at a location of an incident event, and configured to capture thermal images when activated; a processor disposed in the housing and configured to perform operations to cause the thermal images to be streamed over a network; a display disposed in the housing and configured to display the thermal images in real-time or near real-time; a memory disposed in the housing in which the thermal images may be stored; an interface disposed in the housing and configured to facilitate a connection between the shoulder SM device and an external radio; and/or a coupler attached to the housing that allows the shoulder SM device to be removably coupled to an individual.

In some scenarios, the processor is also configured to: detect an injured or unresponsive person based on at least one of the thermal images and location information; cause issuance of an alarm, alert or notification indicating that an injured or unresponsive person has been detected; and/or track movement of the injured or unresponsive person based on at least the thermal images. The alarm, alert or notification causes one or more individuals to be dispatched to the last known location of the injured or unresponsive person.

In those or other scenarios, activation of the thermal imaging device may be achieved through a user-software interaction facilitated by a user interface element of the shoulder SM device, automatically in response to a signal received from a remote device, automatically in response to a voice command, or autonomously based on location information generated by a location device of the shoulder SM device or the external radio. Additionally or alternatively, the thermal imaging device is further configured to be deactivated when the incident event is resolved, the user has checked-out of the incident event, or the shoulder SM device no longer resides at a location of the incident event. Deactivation of the thermal imaging device may be achieved through a user-software interaction facilitated by a user interface element of the shoulder SM device, automatically in response to a signal received from a remote device, automatically in response to a voice command, or autonomously based on location information.

DESCRIPTION OF THE DRAWINGS

Embodiments will be described with reference to the following drawing figures, in which like numerals represent like items throughout the figures.

DETAILED DESCRIPTION

Figure 1:
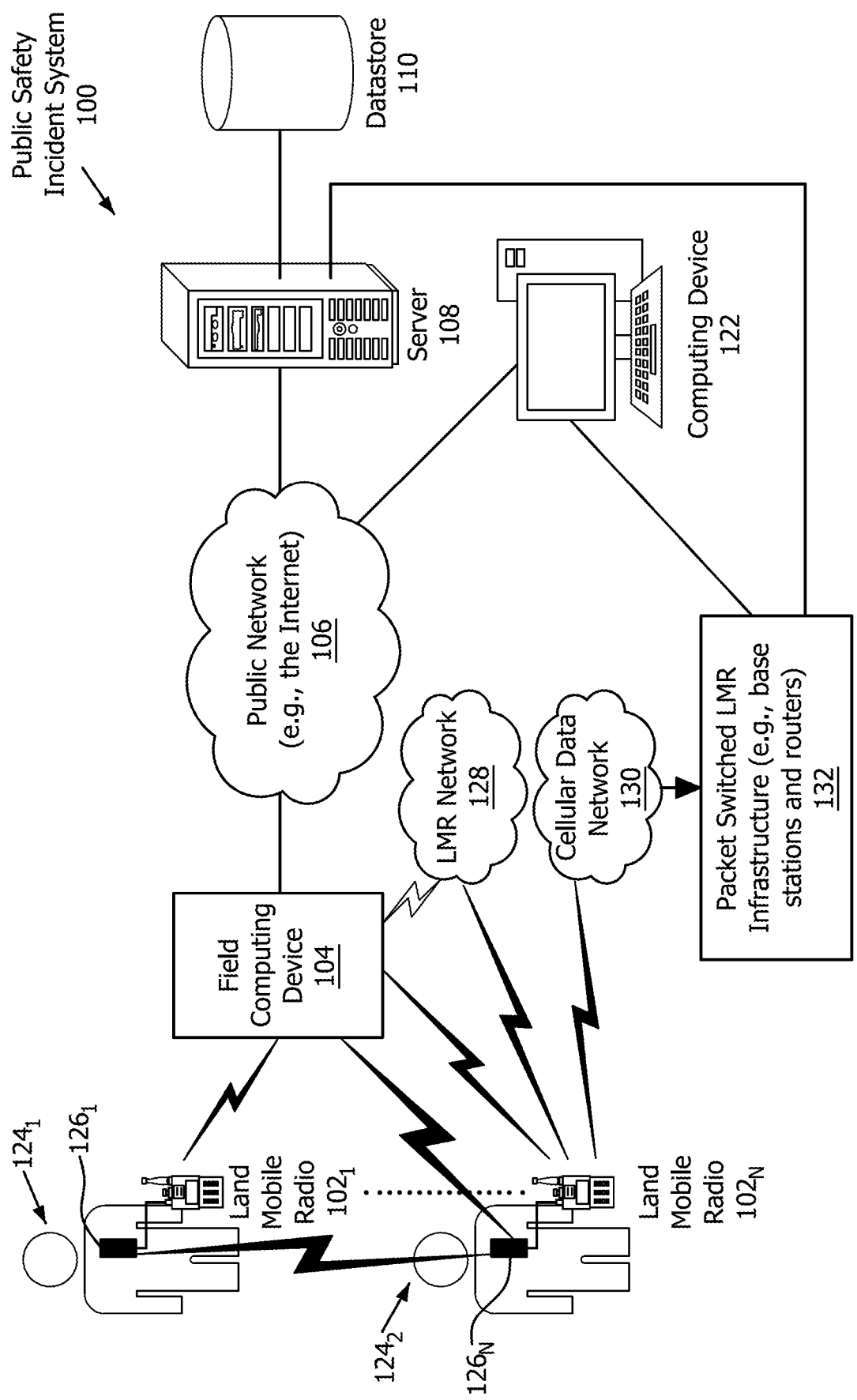
FIG. 1 is an illustration of an illustrative public safety incident system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for facilitating the safety of personnel during public safety incidents. The systems comprise LMRs communicatively coupled to novel shoulder SM devices. The LMRs include Short Range Communication ("SRC") enabled devices, Near Field Communication ("NFC") enabled devices, and/or Radio Frequency Identification ("RFID") enabled devices. The NFC and/or RFID enabled devices are used by individuals to check-into and/or check-out of an incident event via a field computing device (e.g., a laptop, a tablet, a smart phone, a separate LMR device, or other mobile device). The SRC enabled devices are used to communicate check-in/check-out information and other information to a central location (e.g., dispatch center) for storage and/or processing. The other information may include, but is not limited to, timestamp information, unique identifiers, thermal imaging data generated by the shoulder SM devices during the incident event and/or audio data captured by the shoulder SM devices during the incident event. The other information may additionally be communicated from an LMR to the field computing device and/or the other LMRs present at the incident event.

The thermal imaging data and audio data provides information about a surrounding environment and/or the health of the individual(s) at the time of checking-in to the incident event, during the time period in which the incident event is being handled, and/or at the time of checking-out of the incident event. The check-in information includes, but is not limited to, unique identifiers, check-in times and/or location information (e.g., Global Positioning System ("GPS") coordinates). The event handling information includes the temperature of the individual(s), movement of the individual(s), the lack of movement of the individual(s), location information, and/or timestamps. The check-out information includes, but is not limited to, unique identifiers, check-out times and/or location information (e.g., GPS coordinates).

Illustrative System

Referring now to FIG. 1, there is provided an illustration of an illustrative public safety incident system 100. System 100 is designed to manage operations by a field personnel member $124_1, \ldots, 124_N$ (collectively referred to as "124") of public safety and security organizations (e.g., the fire department, police department and/or other emergency response organizations). Each field personnel member is assigned and provided an LMR $102_1, \ldots, 102_N$ (collectively referred to as "102") and a novel shoulder SM device $126_1, \ldots, 126_N$ (collectively referred to as "126"). Similar to conventional LMRs (e.g., the LMR disclosed in U.S. Pat. No. 8,145,262), the LMR $102_1, \ldots, 102_N$ is configured to provide communication with other LMRs and/or a packet switched LMR infrastructure 132 via an LMR network 128 and/or a cellular data network 130. The packet switched LMR infrastructure 132 includes, but is not limited to, base stations and/or routers.

The LMR $102_1, 102_2, \ldots, 102_N$ additionally implements RFID technology, NFC technology, and/or SRC technology. The RFID, NFC and/or SRC technologies facilitate communications between the LMR and a field computing device 104 for incident check-in/check-out purposes. The field computing device 104 includes, but is not limited to, an LMR, a ruggedized tablet, or other incident command solution.

During these RFID, NFC and/or SRC communications, unique identifiers are provided from the LMRs to the field computing device 104. These unique identifiers are used by the field computing device 104 to identify the individual field personnel members 124 that are checking-into an incident event and/or checking-out of an incident event. The field computing device 104 respectively sends signals to the LMRs when the individual field personnel members 124 are successfully checked-in to an incident event. In response to this signal from the field computing device 104, the LMRs perform operations to enable the thermal imaging functions of the shoulder SM devices $126_1, \ldots, 126_N$. These operations can include, but are not limited to, outputting a request to manually enable the thermal imaging function using a switch, button, knob or other electro-mechanical means of the shoulder SM device $126_1, \ldots, 126_N$, and/or sending to each shoulder SM device $126_1, \ldots, 126_N$ a command for automatically enabling the thermal imaging function.

Once enabled, each shoulder SM device $126_1, \ldots, 126_N$ generates thermal images that show areas of varying temperatures in different colors. The thermal images are continuously or periodically sent directly or indirectly (e.g., via the LMRs and/or device 104) from the shoulder SM device $126_1, \ldots, 126_N$ to the field computing device 104, the other shoulder SM devices, the LMRs, and/or at least one remote computing device 108, 122 along with the unique identifier and/or timestamp information. The remote computing device(s) include(s), but is(are) not limited to, a remote server 108 and/or computing device 122 (e.g., a dispatch console). The thermal images sent from the shoulder SM devices $126_1, \ldots, 126_N$ are stored in a datastore 110, a local memory of the field computing device 104, local memories of the shoulder SM devices, and/or local memories of the LMRs $102_1, \ldots, 102_N$. The thermal images may be sent over a packet switched LMR infrastructure 132 and/or a public network 106 (e.g., the Internet).

Figure 2:
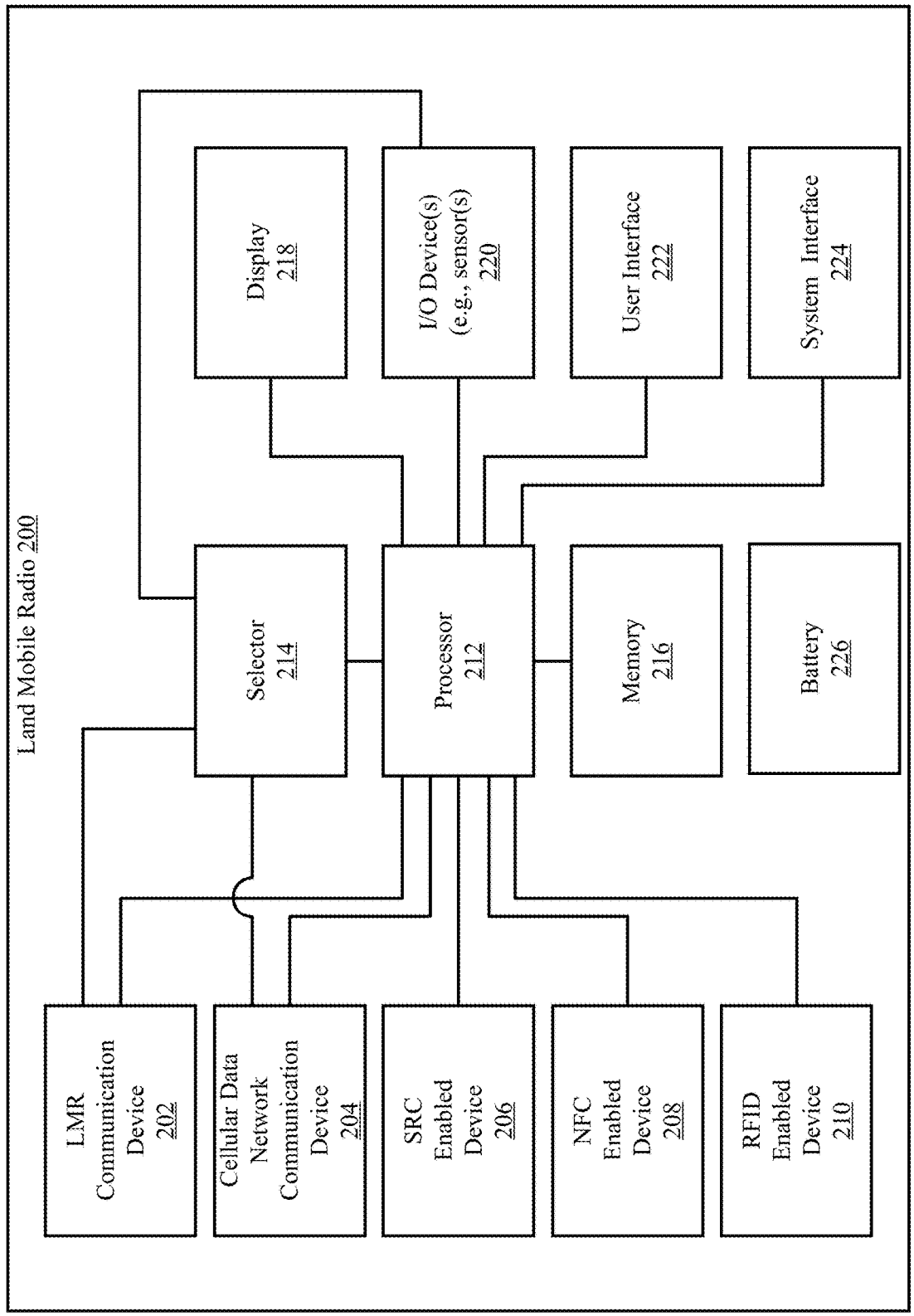
FIG. 2 is an illustration of an illustrative Land Mobile Radio ("LMR").

Referring now to FIG. 2, there is provided an illustration of an illustrative architecture for an LMR 200. LMRs 102 of FIG. 1 are the same as or similar to LMR 200. As such, the discussion of LMR 200 is sufficient for understanding LMRs 102 of FIG. 1.

LMR 200 can include more or less components than that shown in FIG. 2 in accordance with a given application. For example, LMR 200 can include one or both components 208 and 210. The present solution is not limited in this regard.

As shown in FIG. 2, the LMR 200 comprises an LMR communication device 202 and a cellular data network communication device 204. Both of these communication devices 202, 204 enable end-to-end LMR services in manners known in the art. For example, the end-to-end LMR services are achieved in the same or similar manner as that taught in U.S. Pat. No. 8,145,262. The present solution is not limited in this regard. In this way, voice data is communicated from the LMR 200 over an LMR network (e.g., LMR network 128 of FIG. 1) and/or a cellular data network (e.g., cellular data network 130 of FIG. 1). A processor 212 and selector 214 are provided to select whether the LMR network or the cellular data network is to be used for communicating voice data at any given time.

The LMR 200 also comprises an SRC enabled device 206, an NFC enabled device 208 and/or an RFID enabled device 210. The SRC enabled device 206 facilitates SRC communications. An SRC communication occurs between the LMR 200 and an external device (e.g., the field computing device 104 and/or the shoulder SM device $126_1, \ldots, 126_N$ of FIG. 1) over a short distance (e.g., Y feet, where Y is an integer such as ten). The SRC communication may be achieved using SRC transceivers. SRC transceivers are well known in the art, and therefore will not be described in detail herein. Any known or to be known SRC transceiver can be used herein without limitation. For example, a Bluetooth® or Wi-Fi enabled transceiver is used here. The present solution is not limited in this regard.

The NFC enabled device 208 facilitates NFC communications. An NFC communication occurs between the LMR 200 and an external device (e.g., field computing device 104 of FIG. 1) over a relatively small distance (e.g., X centimeters or C inches, where C is an integer such as twelve). The NFC communication may be established by touching the LMR 200 and the external device together or bringing them in close proximity such that an inductive coupling occurs between inductive circuits thereof. In some scenarios, the NFC operates at 13.56 MHz and at rates ranging from 106 kbit/s to 848 kbit/s. The NFC communication may be achieved using NFC transceivers configured to enable contactless communication at 13.56 MHz. NFC transceivers are well known in the art, and therefore will not be described in detail herein. Any known or to be known NFC transceiver can be used herein without limitation. In some scenarios, the NFC enabled device 208 comprises an NFC tag or maker. NFC tags and markers are well known in the art, and will not be described herein.

The RFID enabled device 210 facilitates RFID communications. An RFID communication occurs between the LMR 200 and an external device (e.g., field computing device 104 of FIG. 1) over relatively short distance (e.g., W feet, where W is an integer such as 30 feet). The RFID communication may be achieved using an RF antenna and/or RF transceiver. RF antennas and RF transceivers are well known in the art, and therefore will not be described in detail herein. Any known or to be known RF antenna and/or RF transceiver can be used herein without limitation. In some scenarios, the RFID enabled device 210 comprises a passive RFID tag or an active RFID tag. Both of the listed RFID tags are well known in the art, and will not be described herein.

The above-described communication components 202-210 are connected to a processor 212. A memory 216, display 218, user interface 222, I/O device(s) 220, and/or a system interface 224 are also connected to the processor 212. During operation, the processor 212 is configured to control selection of either the LMR communication device 202 or the cellular data communication device 204 for providing LMR services using the selector 214. The processor 212 is also configured to collect and store data generated by the I/O device(s) 220 and/or external devices (e.g., the shoulder SM device $126_1, \ldots, 126_N$ of FIG. 1). The I/O device(s) include(s), but is(are) not limited to, environmental sensors and/or motion sensors. Accordingly, the data stored in memory 216 can include, but is not limited to, audio, sensor data (e.g., temperature data, moisture data, light data, etc.), and/or thermal images captured by the shoulder SM device $126_1, \ldots, 126_N$ of FIG. 1. This stored data and/or other stored data (e.g., a unique identifier for the LMR 200) can be communicated from the LMR 200 via any communication device 202-210 in accordance with a given application.

The user interface 222 includes, but is not limited to, a plurality of user depressible buttons that may be used, for example, for entering numerical inputs and selecting various functions of the LMR 200. This portion of the user interface may be configured as a keypad. Additional control buttons and/or rotatable knobs may also be provided with the user interface 222. The user interface 222 may additionally or alternatively comprise a touch screen display, and/or a microphone to facilitate voice-activated commands.

The system interface 224 can include an electrical connector for connecting an antenna and/or an external device (e.g., the shoulder SM device $126_1, \ldots, 126_N$ of FIG. 1) to the LMR 200. Such electrical connectors are well known in the art, and therefore will not be described herein.

A battery 224 is provided for powering the components 202-224 of the LMR 200. The battery 224 may comprise a rechargeable and/or replaceable battery. Batteries are well known in the art, and therefore will not be discussed here.

Figure 3:
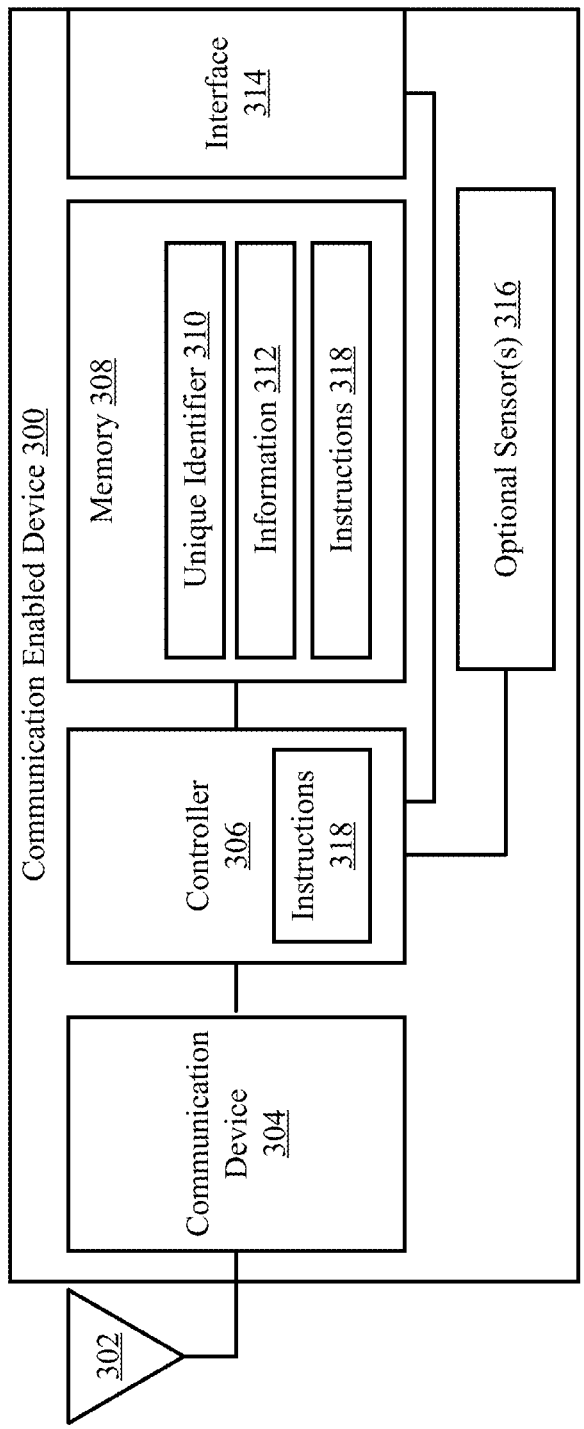
FIG. 3 is an illustration of an illustrative communication enabled device.

Referring now to FIG. 3, there is provided an illustration of an illustrative architecture for a communication enabled device 300. The SRC enabled device 206, NFC enabled device 208, and/or RFID enabled device 210 of FIG. 2 is(are) the same as or similar to the communication enabled device 300. Therefore, the discussion of communication enabled device 300 is sufficient for understanding SRC enabled device 206, NFC enabled device 208, and/or RFID enabled device 210 of FIG. 2.

Communication enabled device 300 can include more or less components than that shown in FIG. 3. However, the components shown are sufficient to disclose an illustrative embodiment implementing the present solution. Some or all of the components of the communication enabled device 300 can be implemented in hardware, software and/or a combination of hardware and software. The hardware includes, but is not limited to, one or more electronic circuits.

The hardware architecture of FIG. 3 represents an illustration of a representative communication enabled device 300 configured to facilitate (a) the checking-in of field personnel members to incident events, (b) the monitoring of field personnel members' health during the handling of the incident events, and/or (c) the checking-out of field personnel members from incident events.

The communication enabled device 300 also comprises an antenna 302 and a communication device 304 for allowing data to be exchanged with the external device via SRC technology, NFC technology, and/or RFID technology. The antenna 302 is configured to receive SRC, NFC and/or RFID signals from the external device and transmit SRC, NFC and/or RFID signals generated by the communication enabled device 300. The communication device 304 may comprise an SRC transceiver, an NFC transceiver and/or an RFID transceiver. SRC, NFC and RFID transceivers are well known in the art, and therefore will not be described herein. However, it should be understood that the SRC, NFC and/or RFID transceiver processes received signals to extract information therein. This information can include, but is not limited to, a request for certain information (e.g., a unique identifier 310 and/or other information 312), and/or a message including information, for example, about the health of a given individual. The communication device 304 may pass the extracted information to the controller 306.

If the extracted information includes a request for certain information, then the controller 306 may perform operations to retrieve a unique identifier 310 and/or other information 312 from memory 308. The other information 312 can include, but is not limited to, sensor data generated by sensors 220 of FIG. 2, audio captured by the shoulder SM device 126₁, . . . , 126ₙ of FIG. 1, and/or thermal images generated by a shoulder SM device 126₁, . . . , 126ₙ of FIG. 1. The retrieved information is then sent from the communication device 304 to a requesting external device (e.g., field computing device 104 of FIG. 1, another LMR, or another shoulder SM device).

In some scenarios, the connections between components 304, 306, 308, 314, 316 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Memory 308 may be a volatile memory and/or a non-volatile memory. For example, the memory 308 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 308 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The components 304-316 of the communication enabled device 300 are coupled to a power source (not shown in FIG. 3). The power source may include, but is not limited to, battery or a power connection (not shown). Alternatively or additionally, the communication enabled device 300 is configured as a passive device which derives power from an RF signal inductively coupled thereto.

Figure 4:
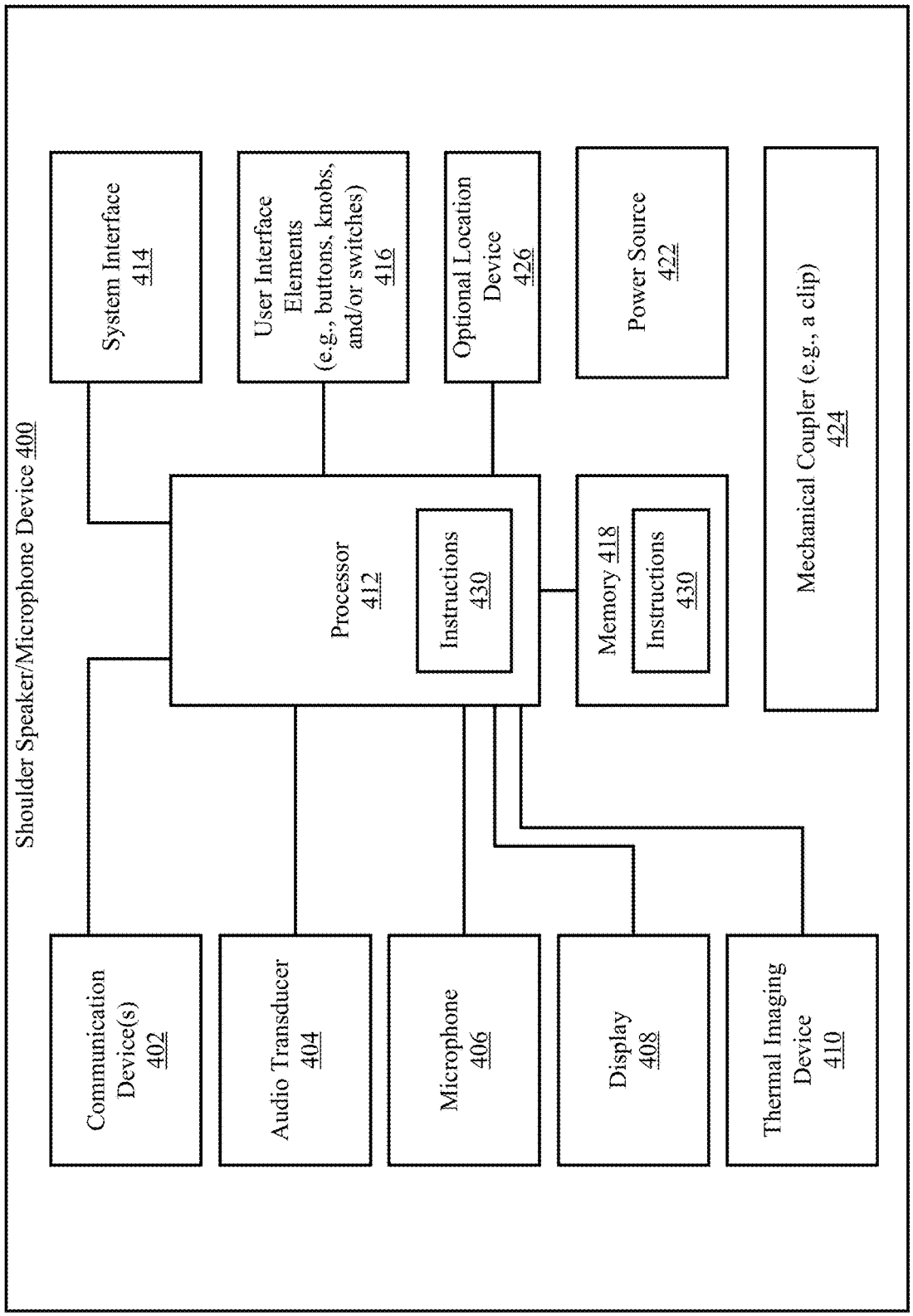
FIG. 4 is an illustration of an illustrative shoulder SM device.
Figure 7:
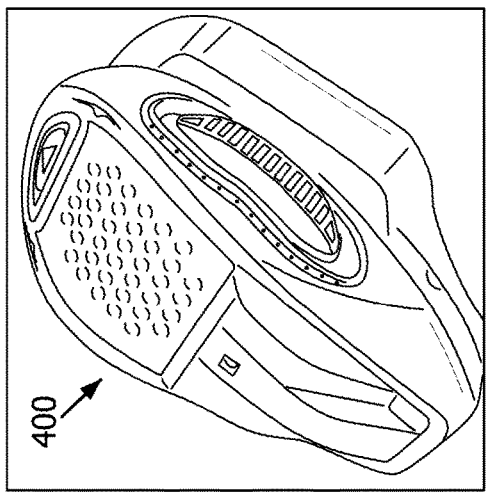
FIGS. 5-8 each provide a perspective view of an illustrative shoulder SM device.
Figure 8:
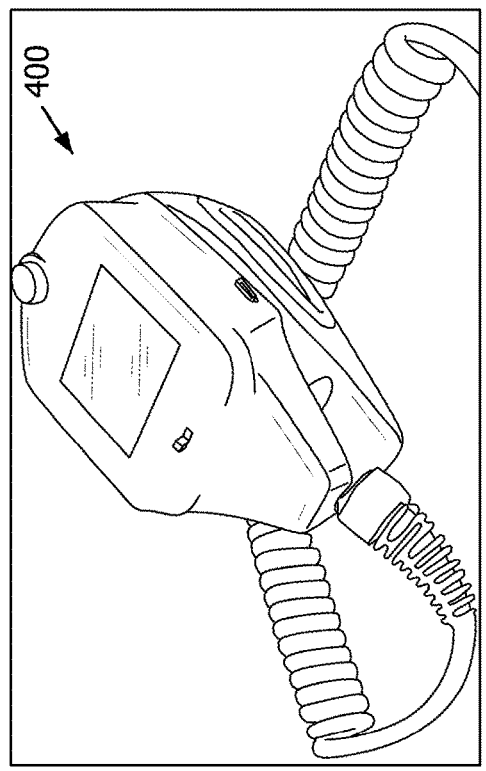

Referring now to FIG. 4, there is provided an illustration of an illustrative shoulder SM device 400. The shoulder SM devices 126 of FIG. 1 are the same as or similar to shoulder SM device 400. As such, the discussion of shoulder SM device 400 is sufficient for understanding shoulder SM devices 126 of FIG. 1.

The shoulder SM device 400 can include more or less components than that shown in FIG. 4 in accordance with a given application. For example, the shoulder SM device 400 can be absent of communication device(s) 402. The present solution is not limited in this regard.

As shown in FIG. 4, the shoulder SM device 400 comprises communication device(s) 402, an audio transducer (e.g., a speaker) 404, a microphone 406, a display 408, and a thermal imaging device 410. The communication device(s) 402 is(are) configured to communicate via public network (e.g., the Internet) communications, cellular data network communications, SRC communications, NFC communications, and/or RFID communications. Each of these listed types of communications are well known in the art, and therefore will not be described in detail here. Similarly, each of the listed components 404, 406, 408, 410 are well known in the art, and therefore will not be described here. Notably, the display 408 can comprise a Liquid Crystal Display ("LCD"), and/or a touch screen display. Also, the communication device(s) 402 can facilitate the continuous (e.g., streaming) and/or periodic wireless communication of audio, thermal images and/or user input data from the shoulder SM device 400 while in use.

The shoulder SM device 400 also comprises a system interface 414 and a user interface 416. The system interface 224 includes an electrical connector for connecting an antenna to the shoulder SM device 400 and/or for establishing a wired connection between an external device (e.g., the LMR 102₁, . . . , 102ₙ of FIG. 1) and the shoulder SM device 400. Such electrical connectors are well known in the art, and therefore will not be described herein. The user interface 416 includes, but is not limited to, one or more input means that may be used, for example, for entering numerical inputs and/or selecting/enabling/disabling various functions of the shoulder SM device 400. The input means can include, but is not limited to, a keypad, a user depressible button, a virtual button of a touch screen display 408, a rotatable knob, a switch, and/or the microphone 406 to facilitate a voice-activated command.

The shoulder SMO device 400 may further comprise an optional location device 426. The location device 426 is generally configured to determine a geographical location of the shoulder SM device 400 and/or track changes in the geographical location. Such location devices are well known in the art, and therefore will not be described herein. For example, the location device can include, but is not limited to, a GPS device and/or a triangulation device. In some scenarios, the location device is also configured to determine an altitude of the shoulder SM device 400 and/or the floor of a building in which the shoulder SM device 400 resides.

These components 402-410, 414-418, 426 are coupled to a processor 412. The processor 412 is generally configured to control operations of the shoulder SM device 400, output audio from the audio transducer (e.g., speaker) 404, process/store audio captured by the microphone 406, present content (e.g., text, media and/or thermal images) on the display, and/or process/store thermal images captured by the thermal imaging device 410. The processor 412 can also cause audio, thermal images and/or user inputs to be communicated to one or more external devices (e.g., LMRs $102_1, \ldots, 102_N$ of FIG. 1) via the communication device(s) 402 and/or system interface 414.

The audio, thermal images and/or user inputs can be stored locally in memory 418. Memory 418 may be a volatile memory and/or a non-volatile memory. For example, the memory 418 can include, but is not limited to, a RAM, a DRAM, an SRAM, a ROM and a flash memory. The memory 418 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

As shown in FIG. 4, one or more sets of instructions 430 (e.g., software code) reside, completely or at least partially, within the memory 430 and/or within the processor 412 during execution thereof by the shoulder SM device 400. The instructions 430 are configured to implement one or more of the methodologies, procedures, or functions described herein. The memory 30 and the processor 412 can constitute machine-readable media. The term "machine-readable media", as used here, refers to a single medium or multiple media (e.g., a centralized or distributed database, and/or associated caches and servers) that store the one or more sets of instructions 430. The term "machine-readable media", as used here, also refers to any medium that is capable of storing, encoding or carrying a set of instructions 430 for execution by the shoulder SM device 400 and that cause the shoulder SM device 400 to perform any one or more of the methodologies of the present disclosure.

The components 402-418, 426 of the shoulder SM device 400 are coupled to a power source 422. The power source may include, but is not limited to, battery or a power connection (not shown) to an LMR $102_1, \ldots, 102_N$ of FIG. 1. Alternatively or additionally, the shoulder SM device 400 is configured as a passive device which derives power from external energy (e.g., light and/or RF signals).

Figure 5:
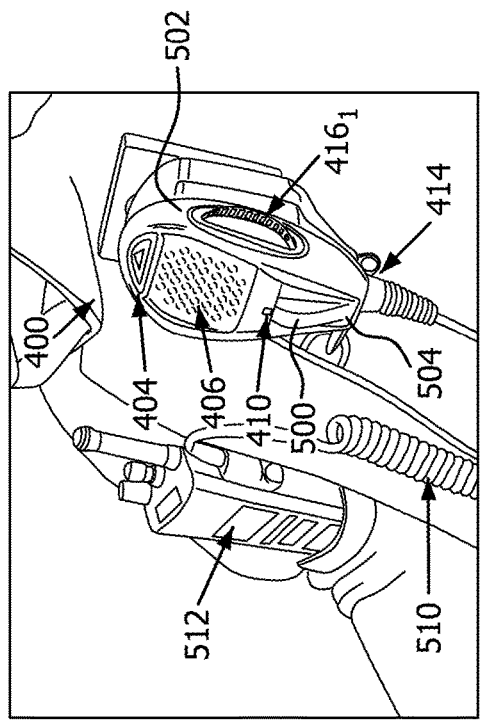
Figure 6:
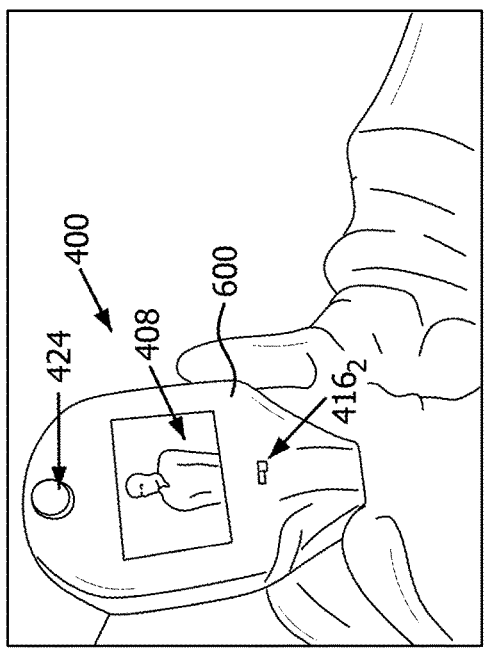

A mechanical coupler 424 is provided to removably couple the shoulder SM device 400 to an individual. For example, the mechanical coupler 424 includes a clip or a magnet for coupling the shoulder SM device 400 to a jacket of a field personnel member (e.g., field personnel member $124_1, \ldots, 124_N$ of FIG. 1), as shown in FIG. 5. The clip/magnet is designed so that the field personnel member can easily uncouple the shoulder SM device 400 from the jacket and re-couple the shoulder SM device 400 to the jacket. The present solution is not limited to the particulars of this example.

Illustrations of an illustrative architecture for the shoulder SM device 400 are provided in FIGS. 5-8. As shown in FIGS. 5-8, the audio transducer 404, the microphone 406, and the thermal imaging device 410 are located in/on a front housing portion 500 of the shoulder SM device 400 so that they are forward facing at least when the shoulder SM device 400 is coupled to the individual. A first user interface element $416_1$ (e.g., a depressible button) is located in/on a side housing portion 502 of the shoulder SM device 400. The first user interface element $416_1$ (e.g., a depressible button) may be provided to allow the individual to turn on and turn off the microphone 406. The system interface 414 is located in/on a bottom housing portion 504 of the shoulder SM device 400. A cable 510 is connected to the system interface 414 for providing a wired connection between the shoulder SM device 400 and an LMR 512 (e.g., LMR $102_1, \ldots,$ or $102_N$ of FIG. 1). The display 408 is located in/on a back housing portion 600 of the shoulder SM device 400 so that it is rear facing at least when the shoulder SM device 400 is coupled to the individual. A second user interface element $416_2$ (e.g., a switch) and the mechanical coupler 424 are also located in/on the back housing portion 600 of the shoulder SM device 400. The second user interface element $416_2$ (e.g., a switch) may be provided to allow the individual to selectively turn on and turn off the display 408 and/or thermal imaging device 410.

The thermal imaging function of the shoulder SM device 400 can be used for detecting/locating an injured or unresponsive civilians and/or field personnel, capturing/recording real events to be used for training purposes, capturing/displaying real time thermal imaging video to a user of the shoulder SM device 400, and/or capturing/streaming real time thermal imaging video for use by one or more individuals (e.g., field personnel and/or dispatcher) to handle an incident event.

Figure 9:
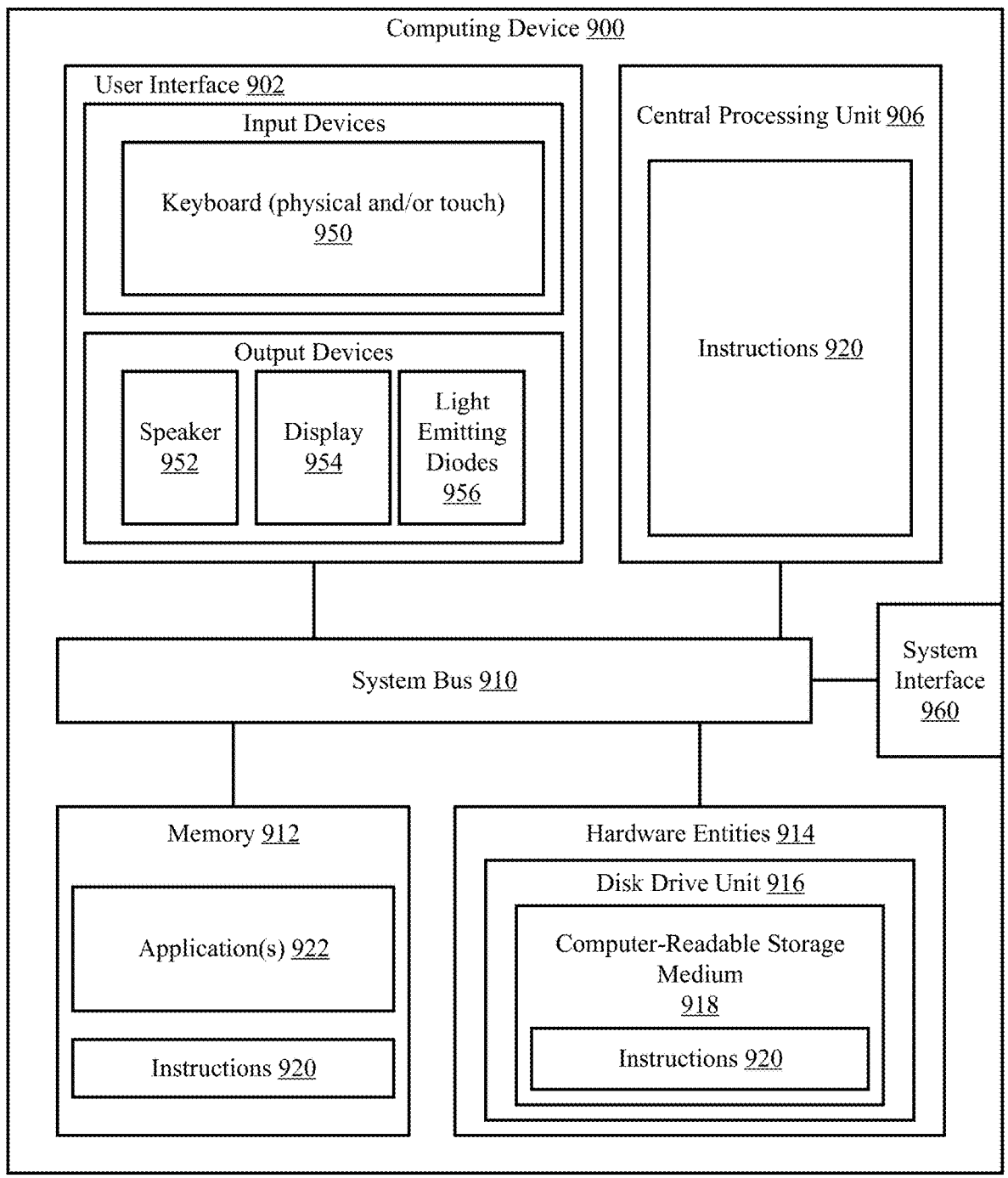
FIG. 9 is an illustration of an illustrative computing device.

Referring now to FIG. 9, there is provided an illustration of an illustrative architecture for a computing device 900. Field computing device 104, computing device 122 and/or server 108 of FIG. 1 is(are) the same as or similar to computing device 900. As such, the discussion of computing device 900 is sufficient for understanding these component of system 100.

In some scenarios, the present solution is used in a client-server architecture. Accordingly, the computing device architecture shown in FIG. 9 is sufficient for understanding the particulars of client computing devices and servers.

Computing device 900 may include more or less components than those shown in FIG. 9. However, the components shown are sufficient to disclose an illustrative solution implementing the present solution. The hardware architecture of FIG. 9 represents one implementation of a representative computing device configured to provide an improved field personnel check-in, check-out and management process, as described herein. As such, the computing device 900 of FIG. 9 implements at least a portion of the method(s) described herein.

Some or all components of the computing device 900 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 9, the computing device 900 comprises a user interface 902, a Central Processing Unit ("CPU") 906, a system bus 910, a memory 912 connected to and accessible by other portions of computing device 900 through system bus 910, a system interface 960, and hardware entities 914 connected to system bus 910. The user interface can include input devices and output devices, which facilitate user-software interactions for controlling operations of the computing device 900. The input devices may include, but are not limited, a physical and/or touch keyboard 950, a mouse, and/or a microphone. The input devices can be connected to the computing device 900 via a wired or wireless connection (e.g., a Bluetooth® connection). The output devices include, but are not limited to, a speaker 952, a display 954, and/or light emitting diodes 956. System interface 960 is configured to facilitate wired or wireless communications to and from external devices (e.g., network nodes such as access points, databases, etc.).

At least some of the hardware entities 914 perform actions involving access to and use of memory 912, which can be a RAM, a disk driver and/or a CD-ROM. Hardware entities 914 can include a disk drive unit 916 comprising a computer-readable storage medium 918 on which is stored one or more sets of instructions 920 (e.g., software code) configured to implement one or more of the methodologies, procedures, or functions described herein. The instructions 920 can also reside, completely or at least partially, within the memory 912 and/or within the CPU 906 during execution thereof by the computing device 900. The memory 912 and the CPU 906 also can constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

Computing device 900 facilitates an improved field personnel check-in, check-out and management process. In this regard, computing device 900 runs one or more software applications 922 for facilitating the collection, processing and/or storage of field personnel related information and/or incident event related information. The field personnel related information includes, but is not limited to, check-in status information, check-out status information, location information, audio information, and/or thermal imaging information. The incident event related information includes, but is not limited to, location information, time information, structure information, surrounding environment information, incident type information, field personnel on-site information, field equipment on-site information, thermal imaging information, and/or incident status information.

Illustrative Method for Facilitating the Safety of Personnel

Figure 10:
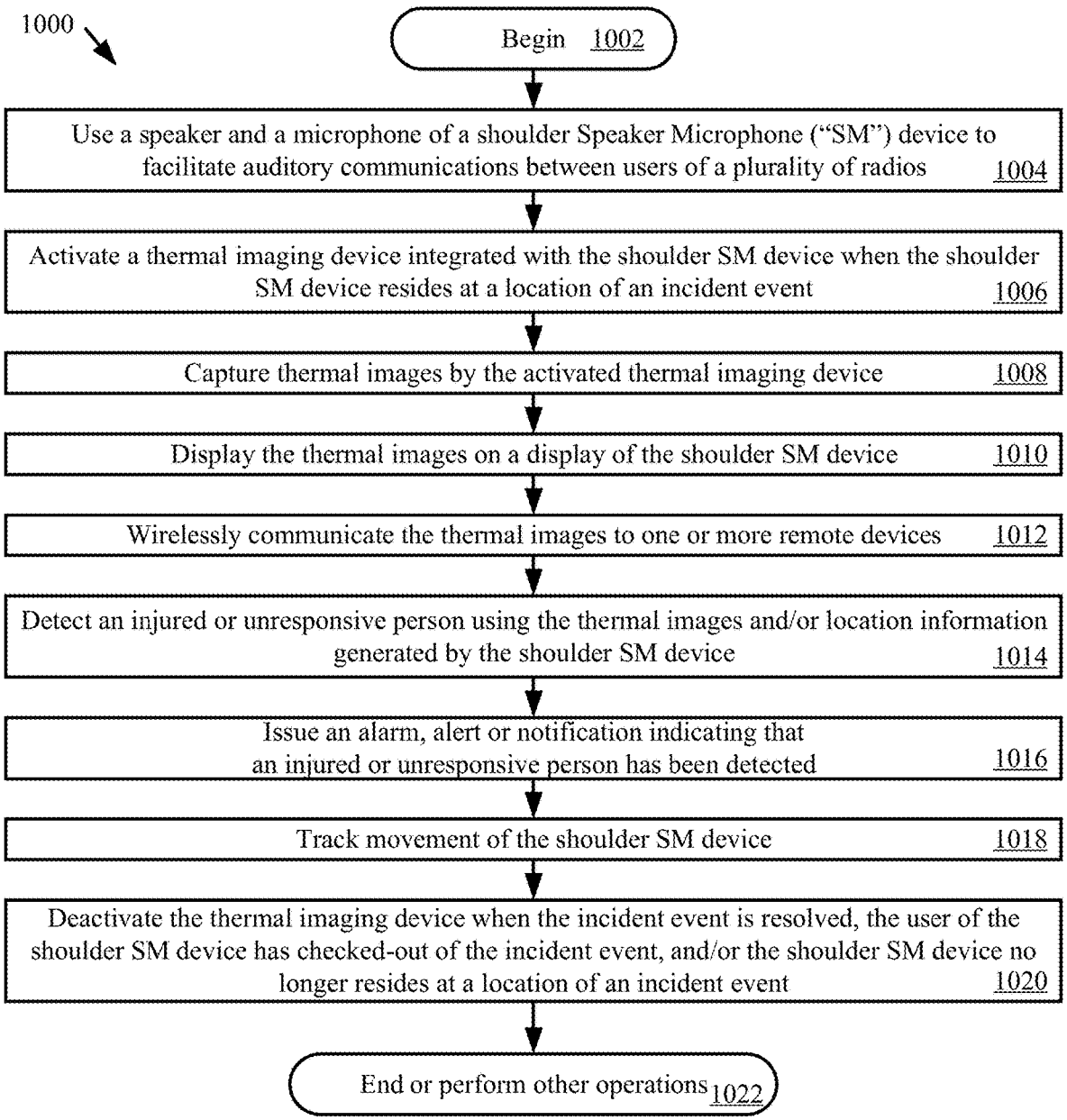
FIG. 10 is a flow diagram of an illustrative method facilitating the safety of personnel during public safety incidents through the use/operation of a shoulder SM device with an integrated thermal imaging device.

Referring now to FIG. 10, there is provided a flow diagram of an illustrative method 1000 for facilitating the safety of personnel (e.g., personnel $124_1, \ldots, 124_N$ of FIG. 1) during public safety incidents. Method 1000 begins with 1002 and continues with 1004 where an audio transducer (e.g., audio transducer 404 of FIG. 4) and a microphone (e.g., microphone 406 of FIG. 4) of a shoulder SM device (e.g., shoulder SM device $126_1, \ldots, 126_N$ of FIG. 1 or 400 of FIG. 4) are used to facilitate auditory communications between users of a plurality of radios (e.g., LMRs $102_1, \ldots,$ or $102_N$ of FIG. 1). Techniques for using shoulder SM devices to facilitate auditory communications are well known in the art, and therefore will not be described herein.

In 1006, a thermal imaging device (e.g., thermal imaging device 410 of FIG. 4) (that is integrated with the shoulder SM device) is activated when the shoulder SM devices resides at a location of an incident event. This thermal imaging device activation can be achieved through a user-software interaction facilitated by a user interface element (e.g., user interface element 416 of FIG. 4) of the shoulder SM device, automatically in response to a signal (e.g., a check-in signal or command signal) received from a remote device (e.g., field computing device 104 of FIG. 1 or a computing device 122 of FIG. 1), automatically in response to a voice command received by the shoulder SM device and/or LMR (e.g., LMR $102_1, \ldots,$ or $102_N$ of FIG. 1) to which the shoulder SM device is communicatively coupled, or autonomously based on location information generated by a location device (e.g., location device 426 of FIG. 4) of the shoulder SM device or radio.

Once activated, the thermal imaging device captures thermal images in 1008. In 1010, the thermal images are displayed on a display (e.g., display 408 of FIG. 4) of the shoulder SM device. The thermal images can be displayed in real-time or near real-time so that the thermal images can be viewed immediately or within milliseconds from their times of capture.

The thermal images may also be wirelessly communicated in 1012 to one or more remote devices. For example, in some scenarios, the thermal images are transmitted directly from a communication device (e.g., communication device 402 of FIG. 4) of the shoulder SM device to a field computing device (e.g., field computing device 104 of FIG. 1), an LMR (e.g., LMR $102_1, \ldots,$ or $102_N$ of FIG. 1), a server (e.g., server 108 of FIG. 1), and/or a computing device (e.g., computing device 122 of FIG. 1). In other scenarios, the thermal images are communicated from the shoulder SM device to a radio (e.g., LMR $102_1, \ldots,$ or $102_N$ of FIG. 1) via a cable (e.g., cable 510 of FIG. 5), and then transmitted from the radio to the field computing device (e.g., field computing device 104 of FIG. 1), one or more other radios, a server (e.g., server 108 of FIG. 1), and/or a computing device (e.g., computing device 122 of FIG. 1). The present solution is not limited to the particulars of these scenarios.

Notably, this wireless communication of the thermal images can be performed on a periodic basis or on a continuous basis (e.g., streamed over a network). In the continuous scenarios, multiple people can view the thermal images in substantially real-time or near real-time as the incident event is being handled. These people can include, but are not limited to, field personnel, a dispatcher at a remote dispatch center, and/or a commander at a central command center. Additionally, other information may be wirelessly communicated with the thermal images in 1012. This other information can include, but is not limited to, timestamp information and/or a unique identifier.

In 1014, operations are performed to detect an injured or unresponsive person using the thermal images and/or location information generated by the shoulder SM device. These operations can be performed by a processor (e.g., processor 412 of FIG. 4) of the shoulder SM device, by the radio, and/or by a remote device (e.g., LMR $102_1, \ldots,$ or $102_N$ of FIG. 1, field computing device 104 of FIG. 1, server 108 of FIG. 1, or computing device 122 of FIG. 1). Such a detection of an injured or unresponsive person can be made by (i) analyzing the thermal images to determine if the person has not moved at all or has only moved a relatively small distance in a given period of time, and/or (ii) analyzing location information generated by a location device (e.g., location device 426 of FIG. 4) to determine or confirm that the person has not moved at all or has only moved a relatively small distance in a given period of time.

Next in 1016, operations are performed to issue an alert, alarm or notification indicating that an injured or unresponsive person has been detected. These operations can be performed by the shoulder SM device, the radio, and/or by a remote device (e.g., LMR 102₁, . . . , or 102ₙ of FIG. 1, field computing device 104 of FIG. 1, server 108 of FIG. 1, or computing device 122 of FIG. 1). The alert and/or alarm can include, but is not limited to, a visual alert/alarm, an auditory alert/alarm, and/or a tactile alert/alarm. The notification can include, but is not limited to, a textual message displayed on a display, a symbol displayed on a display, and/or an auditory message output from a speaker. For example, the alert can include an electronic message (e.g., text message and/or electronic mail message) output from a display of a given device and/or transmitted from a given device to another device for display to particular person(s). The alarm can include a siren noise emitted from an audio transducer of the shoulder SM device. The notification can include the inclusion of a given symbol on a map at a location of the injured or unresponsive person relative to the locations of other individuals on site of the incident event. The present solution is not limited to the particulars of this example. In some scenarios, the alert, alarm or notification are intended to cause the dispatch of one or more individuals to the last known location of the injured or unresponsive person.

In 1018, movement of the shoulder SM device is tracked. In this regard, communication of thermal images and/or location information from the shoulder SM device is continued even after an injured or unresponsive person is detected in 1014. This feature of the present solution allows movement of the injured or unresponsive person to be monitored and tracked after one or more individuals have been dispatched to assist the injured or unresponsive person. The tracked movement can ensure that the injured or unresponsive person receives medical care in a relatively short amount of time or an optimized amount of time.

In 1020, the thermal imaging device is deactivated manually or automatically. This deactivation can be performed when the incident event is resolved, the user of the shoulder SM device has checked-out of the incident event, and/or the shoulder SM device no longer resides at a location of an incident event. The thermal imaging device deactivation can be achieved through a user-software interaction facilitated by a user interface element (e.g., user interface element 416 of FIG. 4) of the shoulder SM device, automatically in response to a signal (e.g., a check-in signal or command signal) received from an external device (e.g., field computing device 104 of FIG. 1 or a computing device 122 of FIG. 1), automatically in response to a voice command received by the shoulder SM device and/or LMR (e.g., LMR 102₁, . . . , or 102ₙ of FIG. 1) to which the shoulder SM device is communicatively coupled, or autonomously based on location information generated by a location device (e.g., location device 426 of FIG. 4) of the shoulder SM device.

Subsequently, 1022 is performed where method 1000 ends or other operations are performed. Such other operations can include, but are not limited to, returning to 1002, 1004, or 1006 so that another iteration of some or all of method 1000 is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for operating a shoulder Speaker Microphone ("SM") device coupled to a radio, comprising:
   using a speaker and a microphone of the shoulder SM device to facilitate auditory communications to and from a user of the radio;
   activating thermal imaging functions of a thermal imaging device integrated with the shoulder SM device automatically in response to certain audio being captured by the shoulder SM device or certain sensor data being generated by a sensor device of the shoulder SM device;
   capturing thermal images by the thermal imaging device of the shoulder SM device;
   analyzing the thermal images to detect an injured or unresponsive person;
   generating at least one of an alarm, an alert, and a notification to indicate that the injured or unresponsive person has been detected; and
   performing operations by the shoulder SM device to cause the thermal images to be streamed over a network.

2. The method according to claim 1, wherein the certain audio comprises a voice command and the certain sensor data comprising a location.

3. The method according to claim 1, further comprising displaying the thermal images on a display integrated with the shoulder SM device in real-time or near real-time.

4. The method according to claim 1, further comprising using location information generated by a location device of the shoulder SM device or radio to determine a location of the inured or unresponsive person.

5. The method according to claim 4, wherein notification detected includes information specifying a last known location of the injured or unresponsive person.

6. The method according to claim 5, wherein the alarm, alert or notification causes one or more individuals to be dispatched to the last known location of the injured or unresponsive person.

7. The method according to claim 4, further comprising tracking movement of the injured or unresponsive person based on at least the thermal images.

8. The method according to claim 1, further comprising storing the thermal images in at least one of a memory local to the shoulder SM device and a remote datastore.

9. The method according to claim 1, further comprising deactivating the thermal imaging device when the incident event is resolved, the user of the radio has checked-out of the incident event, or the shoulder SM device no longer resides at a location of the incident event.

10. The method according to claim 9, wherein deactivation of the thermal imaging device is achieved through a user-software interaction facilitated by a user interface element of the shoulder SM device, automatically in response to a signal received from a remote device, automatically in response to a voice command, or autonomously based on location information.

11. A shoulder Speaker Microphone ("SM") device, comprising:

a housing;

an audio transducer disposed in the housing and configured to output audio;

a microphone disposed in the housing and configured to capture audio;

a thermal imaging device disposed in the housing, configured to perform thermal imaging functions for capturing thermal images when activated automatically in response to certain audio being captured by the shoulder SM device or certain sensor data being generated by a sensor device of the shoulder SM device;

a processor disposed in the housing and configured to perform operations to cause the thermal images to be streamed over a network;

an interface disposed in the housing and configured to facilitate a connection between the shoulder SM device and an external radio; and a coupler attached to the housing that allows the shoulder SM device to be removably coupled to an individual;

wherein the processor is further configured to analyze the thermal images and generate at least one of an alarm, an alert, and a notification to indicate the presence of an injured or unresponsive person.

12. The shoulder SM device according to claim 11, wherein the certain audio comprises a voice command and the certain sensor data comprising a location.

13. The shoulder SM device according to claim 11, further comprising a display disposed in the housing and configured to display the thermal images in real-time or near real-time.

14. The shoulder SM device according to claim 11, further comprising a location sensing device configured to determine a location of the injured or unresponsive person.

15. The shoulder SM device according to claim 14, wherein the notification includes location information specifying a last known location of the injured or unresponsive person notification.

16. The shoulder SM device according to claim 15, wherein the alarm, alert or notification causes one or more individuals to be dispatched to the last known location of the injured or unresponsive person.

17. The shoulder SM device according to claim 11, further comprising a memory disposed in the housing in which the thermal images are stored.

18. The shoulder SM device according to claim 11, wherein the thermal imaging device is further configured to be deactivated when the incident event is resolved, the user has checked-out of the incident event, or the shoulder SM device no longer resides at a location of the incident event.

19. The shoulder SM device according to claim 18, wherein deactivation of the thermal imaging device is achieved through a user-software interaction facilitated by a user interface element of the shoulder SM device, automatically in response to a signal received from a remote device, automatically in response to a voice command, or autonomously based on location information.

20. A method for operating a shoulder Speaker Microphone ("SM") device coupled to a radio, comprising:

using a speaker and a microphone of the shoulder SM device to facilitate auditory communications to and from a user of the radio;

activating thermal imaging functions of a thermal imaging device integrated with the shoulder SM device automatically in response to certain audio being captured by the shoulder SM device or certain sensor data being generated by a sensor device of the shoulder SM device;

capturing with the thermal imaging device of the shoulder SM device thermal images of a surrounding environment of the user;

analyzing the thermal images; and generating at least one of an alarm, an alert, and a notification if the analyzing indicates that the user has not moved in a given period of time.

* * * * *